(12) United States Patent
Natarajan et al.

(10) Patent No.: US 12,118,994 B2
(45) Date of Patent: Oct. 15, 2024

(54) PROVIDING CONTEXTUAL AUTOMATED ASSISTANT ACTION SUGGESTION(S) VIA A VEHICLE COMPUTING DEVICE

(71) Applicant: GOOGLE LLC, Mountain View, CA (US)

(72) Inventors: Sriram Natarajan, San Jose, CA (US); Yuxin Yu, San Jose, CA (US); Josh Brown, Seattle, WA (US); David Notario, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 273 days.

(21) Appl. No.: 17/676,646

(22) Filed: Feb. 21, 2022

(65) Prior Publication Data

US 2023/0252984 A1    Aug. 10, 2023

Related U.S. Application Data

(60) Provisional application No. 63/308,349, filed on Feb. 9, 2022.

(51) Int. Cl.
*G10L 15/22*  (2006.01)
*G06F 3/0481*  (2022.01)
(Continued)

(52) U.S. Cl.
CPC ............ *G10L 15/22* (2013.01); *G06F 3/0481* (2013.01); *G06F 3/0488* (2013.01); *G06F 3/167* (2013.01);
(Continued)

(58) Field of Classification Search
CPC ....... G10L 15/22; G10L 15/063; G10L 15/08; G10L 2015/088; G10L 2015/223;
(Continued)

(56) References Cited

U.S. PATENT DOCUMENTS 9,501,178 B1  11/2016  Cassezza
11,238,857 B2  2/2022  Skobeltsyn et al.
(Continued)

FOREIGN PATENT DOCUMENTS

WO    2017197010    11/2017

OTHER PUBLICATIONS

European Patent Office; International Search Report and Written Opinion issued in Application No. PCT/US2022/035946; 32 pages; dated Nov. 16, 2022.

(Continued)

*Primary Examiner* — George C Monikang
(74) *Attorney, Agent, or Firm* — Gray Ice Higdon

(57) ABSTRACT

Implementations set forth herein relate to an automated assistant that can provide suggestions for a user to interact with the automated assistant to control applications while in a vehicle. The suggestions can be provided to encourage hands-free interactions with the applications, by suggesting an assistant input that invokes the automated assistant to operate as an interface between the user and the applications. Assistant suggestions can be based on a context of a user and/or a context of the vehicle, such as content of a display interface of a device that the user is accessing while in the vehicle. For instance, the automated assistant can determine that an action that the user has employed an application to perform can be initialized more safely and/or in less time by utilizing a particular assistant input. This particular assistant input can then be rendered at an interface of a vehicle computing device.

15 Claims, 7 Drawing Sheets

(51) Int. Cl.
*G06F 3/0488* (2022.01)
*G06F 3/16* (2006.01)
*G06F 9/451* (2018.01)
*G10L 15/06* (2013.01)
*G10L 15/08* (2006.01)
*B60R 16/037* (2006.01)

(52) U.S. Cl.
CPC ............ G06F 9/453 (2018.02); G10L 15/063 (2013.01); G10L 15/08 (2013.01); B60R 16/0373 (2013.01); *G10L 2015/088* (2013.01); *G10L 2015/223* (2013.01); *G10L 2015/227* (2013.01)

(58) Field of Classification Search
CPC ............ G10L 2015/227; G06F 3/0481; G06F 3/0488; G06F 3/167; G06F 9/453; B60R 16/0373
USPC .................................... 704/9, 231, 246, 251
See application file for complete search history.

(56) References Cited

U.S. PATENT DOCUMENTS

| | | | |
|---|---|---|---|
| 2007/0050191 A1* | 3/2007 | Weider | G06F 16/951 704/E15.04 |
| 2014/0278439 A1* | 9/2014 | Rajagopal | G10L 15/01 704/275 |
| 2016/0118048 A1* | 4/2016 | Heide | G10L 15/22 704/275 |

OTHER PUBLICATIONS

"The 5 best user onboarding examples" Appcues. 2021, 24 pages.
Antonescu et al., "Finding Your Brand's Voice: 6 Ways to Build A Better VUI" SoundHound Inc. 58 pages.
Karen Scates "Make Your Voice Assistant Discoverable and Increase Adoption" SoundHound Inc. 2020, 13 pages.

* cited by examiner

PROVIDING CONTEXTUAL AUTOMATED ASSISTANT ACTION SUGGESTION(S) VIA A VEHICLE COMPUTING DEVICE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, an automated assistant can be accessed in a vehicle via an integrated vehicle computing device—which can also provide access to other applications. Although the automated assistant can provide a number of benefits to a user, the user may not be entirely aware of all of the functionality of the automated assistant. In particular, the automated assistant may provide functionality that can assist the user with hands-free control of other applications that are available via the vehicle computing device. However, the user may only invoke and utilize the automated assistant when attempting to control functionality that the user considers to be limited to the automated assistant, and manually control features of other applications without invoking and utilizing from the automated assistant. This manual control of the features of these applications can increase a quantity of user inputs received via the vehicle computing device, thereby wasting computational resources of the vehicle computing devices. Further, this manual control of the features of these applications can also increase user distraction while driving the vehicle, since driving and manually interacting with the vehicle computing device can cause the user to direct their attention away from driving.

For instance, a user that places a phone call via a vehicle phone application may necessarily input each number of a phone number or each character of a contact name by gazing down at, and tapping, a graphical keypad rendered at a display interface of the vehicle computing device. Similarly, a user that seeks to stream media from the internet may also navigate a media application by gazing down at, and tapping, GUI elements of the media application to initialize playback of some desired media. Accordingly, not only does this manual control of the features of these applications unnecessarily waste computational resources of the vehicle computing device, but it also increases user distraction.

SUMMARY

Implementations set forth herein relate to an automated assistant that can provide suggestions for assistant inputs to provide to the automated assistant to control certain other applications when a user is within a vehicle and is currently controlling, or is predicted to control, the certain other applications. The vehicle can include a vehicle computing device that can provide access to a variety of different applications, including an automated assistant application that is associated with the automated assistant. Additionally, the automated assistant that is accessible via the vehicle computing device can be a counterpart of another automated assistant that is accessible via one or more other devices, such as a mobile computing device (e.g., a cellular phone). In some implementations, the automated assistant can operate as an interface between a user and a given vehicle application of the vehicle computing device, and/or between the user and a given mobile application of the mobile computing device. In certain instances, the automated assistant can provide, via the vehicle computing device, suggestions for assistant inputs that can be submitted by a user and to the automated assistant that, when submitted, can cause the automated assistant to control one or more features of these applications. This can streamline certain interactions between a user and an application by reducing a quantity of inputs that may otherwise be used to control features of certain applications through manual interactions with the certain applications. Additionally, this can reduce user distraction of the user while driving the vehicle or riding in the vehicle by enabling the user to rely on hands-free interactions with the automated assistant to control various applications while driving the vehicle or riding in their vehicle.

As an example, a user can be riding in a vehicle while interacting with an application. The application can be, for example, a health application, and the user can be interacting with the health application to schedule an appointment with their primary care doctor. The vehicle can include a vehicle computing device, which can provide access to the automated assistant application and the health application, and can include a display interface. The automated assistant can also be accessible via a cellular phone of the user, which can include an automated assistant application that is a counterpart of the automated assistant that is accessible via the vehicle computing device. Further, the health application can also be accessible via the cellular phone of the user. Accordingly, the automated assistant can determine, with prior permission from the user, that the user is interacting with the health application while riding in the vehicle via the vehicle computing device and/or the cellular phone of the user, and can process contextual data to provide a contextual automated assistant suggested action to the user via the display interface of the vehicle computing device. This contextual automated assistant suggested action can, for example, educate the user as to how to interact with the health application in a hands-free manner via the automated assistant.

In this example, contextual data can include, for instance, contextual data associated with the user, contextual data associated with the cellular phone of the user, and/or contextual data associated with the vehicle computing device, such as a screenshot of the healthcare application being interacted with by the user via the cellular phone of the user and/or the vehicle computing device, a destination of the vehicle, a current location of the vehicle, an identifier for the user (with prior permission from the user), data characterizing features of recent interactions between the user and one or more applications, and/or any other related data can be processed by the automated assistant. Further, the contextual data can be processed for determining one or more operations that the user is currently engaged in, and/or is expected to initialize, via the health application. For instance, a screenshot of the health application can include graphics and/or text characterizing a graphical user interface (GUI) for scheduling an appointment with a doctor. Data characterizing this screenshot can be processed using one or more heuristic processes and/or one or more trained machine learning models to determine one or more operations (e.g., creating an appointment, canceling an appointment, rescheduling an appointment, etc.) that can be controlled via the GUI. Based on this determination, one or more particular operations can be selected as a basis for generating suggestion data, which can characterize an assistant input that can be submitted by the user to the automated assistant, in lieu of the user manually interacting with the health application, to control the one or more particular operations of the health application.

In this example, suggestion data generated by the automated assistant can characterize a spoken utterance such as, "Try saying 'Assistant, schedule an appointment with Dr. Chow for Tuesday at 3:00 PM.'" The automated assistant can cause text of the spoken utterance to be visually rendered as a graphical element at the display interface of the vehicle computing device simultaneous to the user interacting with the health application and/or subsequent to the user interacting with the health application. The graphical element can put the user on notice, before, during, and/or after the user interacts with the health application that the automated assistant can perform the specified operation (e.g., scheduling an appointment) for the current interaction with the health application and/or in lieu of future interactions with the health application in response to the user providing the rendered spoken utterance. For instance, when the user looks over to see the suggestion being rendered at the display interface of the vehicle computing device, the user can provide the spoken utterance to the automated assistant. Audio embodying the spoken utterance can be received at an audio interface (e.g., one or more microphones) of the vehicle computing device and/or the cellular phone to cause an instance of the automated assistant to interact with the health application. The automated assistant can thereby cause the health application to schedule the appointment for the user—without the user manually interacting (e.g., directly tapping a touch interface of the cellular phone) with their cellular phone and/or the vehicle computing device while they are in their vehicle.

In some implementations, suggestions for assistant inputs can be rendered subsequent to the user interacting with the application. For instance, assume in the above example that the user manually interacts with the health application to schedule the appointment. Further assume that the user successfully schedules the appointment through this manual interaction and a confirmation for the appointment is provided for display via the cellular phone and/or the vehicle computing device. In this instance, the user may receive a suggestion from their automated assistant while riding when the confirmation is displayed. The suggestion may characterize a spoken utterance that, when provided to the automated assistant in the future causes the automated assistant to control a feature of the health application that the user may have previously utilized while riding in the vehicle, such as "By the way, next time you can say 'Assistant, schedule an appointment with Dr. Chow for Tuesday at 3:00 PM.'"

In some implementations, suggestions for assistant inputs can be rendered prior to the user interacting with another application. For instance, a user that interacts with a particular application while riding in their car one day may receive a suggestion from their automated assistant while riding in their car during a different day. The suggestion may characterize a spoken utterance that, when provided to the automated assistant, causes the automated assistant to control a feature of an application that the user may have previously utilized while riding in the vehicle. For example, the automated assistant may cause a suggestion such as "Assistant, play my health podcast," while riding in their vehicle if, during a previous ride in their vehicle, the user accessed a podcast application to play a "health podcast."

Alternatively, or additionally, applications accessed directly via the vehicle computing device can be controlled, with prior permission from the user, by the automated assistant, and can therefore be the subject of assistant suggestions. For example, a user who is predicted to interact with a vehicle maintenance application of their vehicle computing device can receive a suggestion, via an interface of the vehicle computing device, regarding controlling a feature of the vehicle maintenance application. For instance, a user may typically access their vehicle maintenance application a few minutes into a drive that is over a threshold distance (e.g., 100 miles), in order to see whether there are any charging stations near their destination. Based on this contextual data, the automated assistant can cause the vehicle computing device to render a suggestion such as, "Assistant, show me charging stations near my destination," the next time the user selects to navigate to a destination that is over the threshold distance away (e.g., over 100 miles away), but prior to the user accessing the vehicle maintenance application.

In some implementations, a given suggestion for a given assistant input may only be rendered for presentation to a given user a threshold quantity of times to reduce a quantity of computational resources consumed in generating the suggestions and to reduce user annoyance. For instance, the suggestion of "By the way, next time you can say 'Assistant, schedule an appointment with Dr. Chow for Tuesday at 3:00 PM'" in the above example may only be provided for presentation to the user once to educate the user with respect to the automated assistant functionality. Accordingly, if the user subsequently begins interacting with the health application via the vehicle computing device to schedule a subsequent appointment, the suggestion may not be provided. However, if the user subsequently begins interacting with the health application via to the cellular phone and/or the vehicle computing device to cancel a previously scheduled health appointment, then an additional suggestion of "By the way, next time you can say 'Assistant, cancel my appointment with Dr. Chow'" may be generated and provided for presentation to the user in the same or similar manner described above.

In additional or alternative implementations, a given suggestion for a given application may only be rendered for presentation to a given user a threshold quantity of times to reduce a quantity of computational resources consumed in generating the suggestions and to reduce user annoyance. For instance, the suggestion of "By the way, next time you can say 'Assistant, schedule an appointment with Dr. Chow for Tuesday at 3:00 PM'" in the above example may only be provided for presentation to the user once to educate the user with respect to the automated assistant functionality. Further, the suggestion may additionally include other suggestions with respect to the health application. For instance, the suggestion may additionally include "You can also say 'Assistant, cancel my appointment' or 'Assistant, reschedule my appointment'", or include any additional functionality that the automated assistant can perform with respect to the health application. In this instance, the automated assistant proactively educates the user with respect to multiple assistant inputs that may be provided to cause the automated assistant to control different features of the health application.

By using techniques described herein, various technical advantages can be achieved. As one non-limiting example, techniques described herein enable a system to provide contextually relevant automated assistant action suggestion(s) in a vehicular environment to reduce consumption of computational resources and/or reduce driver distraction. For instance, techniques described herein can detect interactions with a vehicle computing device of a vehicle of a user and/or a mobile computing device of the user while the user is located in the vehicle. Further, techniques described herein can identify contextual information associated with the interactions. Based on the interactions and/or the contextual information associated with the interactions, the system can generate and provide the suggestion(s) for presentation to the user when the user completes the interaction and/or is predicted to initiate an interaction to enable the interaction to be initialized and completed in a hands-free manner. As a result, computational resources can be conserved based on at least a reduced quantity of user inputs to achieve the interactions, and user distraction reduced based on obviating the need for the user inputs.

The above description is provided as an overview of some implementations of the present disclosure. Further description of those implementations, and other implementations, are described in more detail below.

DETAILED DESCRIPTION

Figure 1A:
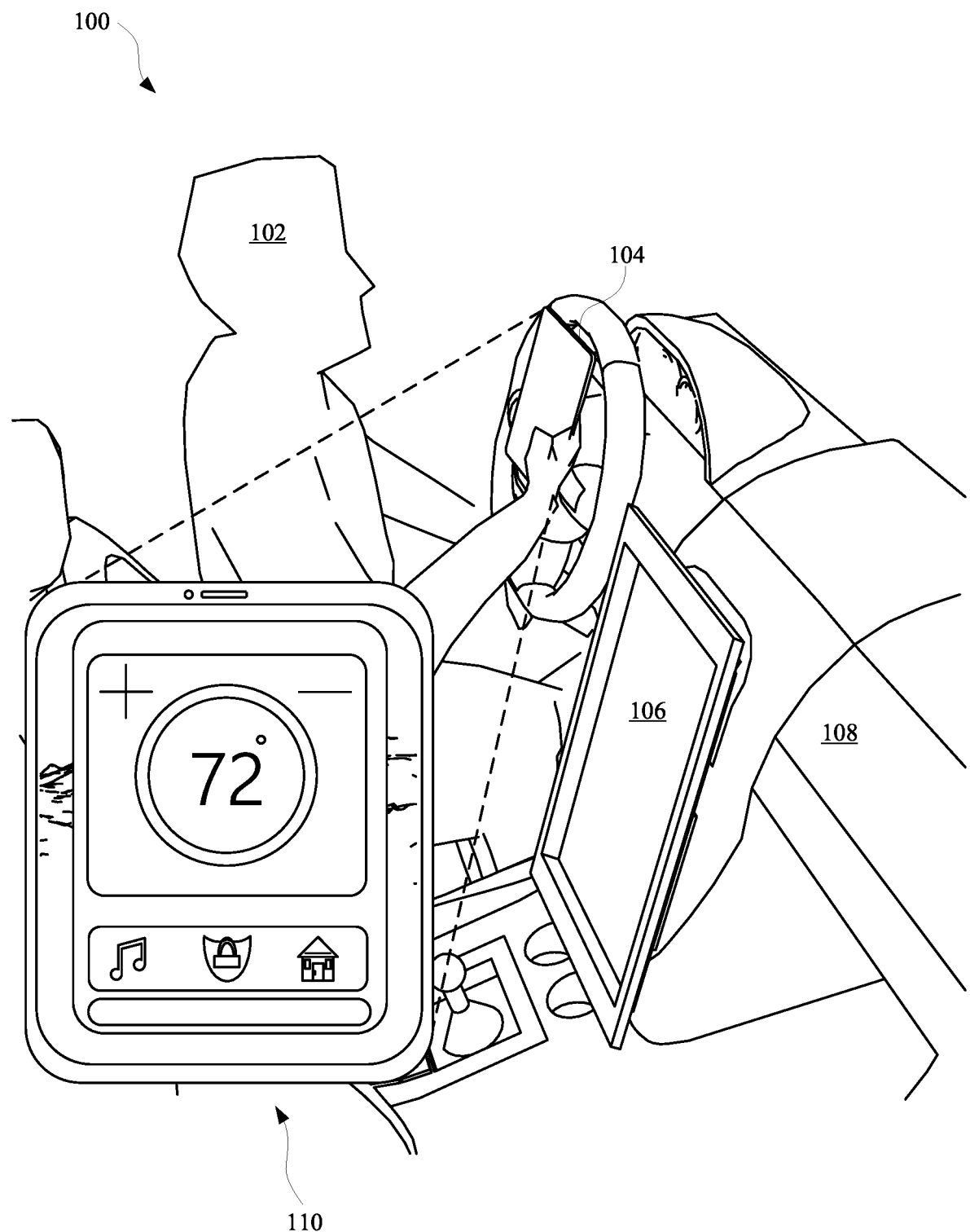
FIG. 1A, FIG. 1B, FIG. 1C, and FIG. 1D illustrate views of a user receiving a suggestion of an assistant input that can be utilized to direct an automated assistant to safely interact with an application while the user is in a vehicle, in accordance with various implementations.

FIG. 1A, FIG. 1B, FIG. 1C, and FIG. 1D illustrate a view 100, a view 120, a view 140, and a view 160, respectively, of a user 102 receiving a suggestion of an assistant input that can be utilized to direct an automated assistant to safely interact with an application while the user 102 is in a vehicle 108. In some implementations, the user 102 can be interacting with an application via a mobile or portable computing device 104 (e.g., a cellular phone of the user 102) and/or a vehicle computing device 106 of the vehicle 108. The application can be separate from the automated assistant, which can be accessible via the portable computing device 104 and/or the vehicle computing device 106 via respective instances of an automated assistant application executing thereon. The user 102 can access respective instances of the application via the portable computing device 104 while the user 102 is driving and/or riding in the vehicle 108, and/or via the vehicle computing device 106 while the user 102 is driving and/or riding in the vehicle 108. The automated assistant can operate as an interface between the user 102 and the instances of the application to promote safe driving practices, and also reduce a number of inputs that may be necessary to control the respective instances of the application.

For example, and as illustrated in FIG. 1A, the user 102 can be accessing an instance of an internet of things (IoT) application via the portable computing device 104 when the user 102 is driving the vehicle 108. In this example, the user 102 can be interacting with the instance of the IoT application to modify a temperature setting of a home thermostat via an application interface of the IoT application. Prior to, and/or during the interaction between the user 102 and the portable computing device 104, the automated assistant can determine that the user 102 is located within the vehicle 108 and interacting with the instance of the IoT application. The automated assistant can process data from a variety of different sources to make this determination. For example, data based on one or more sensors within the vehicle 108 can be utilized to determine (e.g., using facial recognition, voice signature, touch input, etc.), with prior permission from the user 102, the user is in the vehicle 108. Alternatively, or additionally, the data characterizing screen content 110 of the portable computing device 104 can be processed, with prior permission from the user 102, to determine one or more features of the instance of the IoT application and/or one or more applications operating in a background of the portable computing device 104 that the user 102 make be controlling, and/or seeking to control.

For example, the screen content 110 can include a GUI element for controlling a temperature of a living room in a home of the user 102. The screen content 110 can be processed using one or more heuristic processes and/or one or more trained machine learning models to identify one or more different controllable features of the screen content 110. The identified feature(s) can be utilized to generate a suggestion for an assistant input that can be provided, by the user 102 and to the automated assistant, to invoke the automated assistant to control the identified feature(s) of the instance of the IoT application. In some implementations, the suggestion can be generated using an application programming interface (API) for data to be communicated between the instance of the IoT application and the automated assistant. Alternatively, or additionally, the suggestion data can be generated using content that is accessible via one or more interfaces of the instance of the IoT application. For instance, a feature of the screen content 110 can be a selectable GUI element, and the selectable GUI element can be rendered in association with natural language content (e.g., "72 degrees"). In some implementations, a GUI element can be determined to be selectable based on data that is available to the automated assistant, such as HTML code, XML code, document object model (DOM) data, application programming interface (API) data, and/or any other information that can indicate whether certain features of an application interface of the instance of the IoT application are selectable.

Figure 1B:
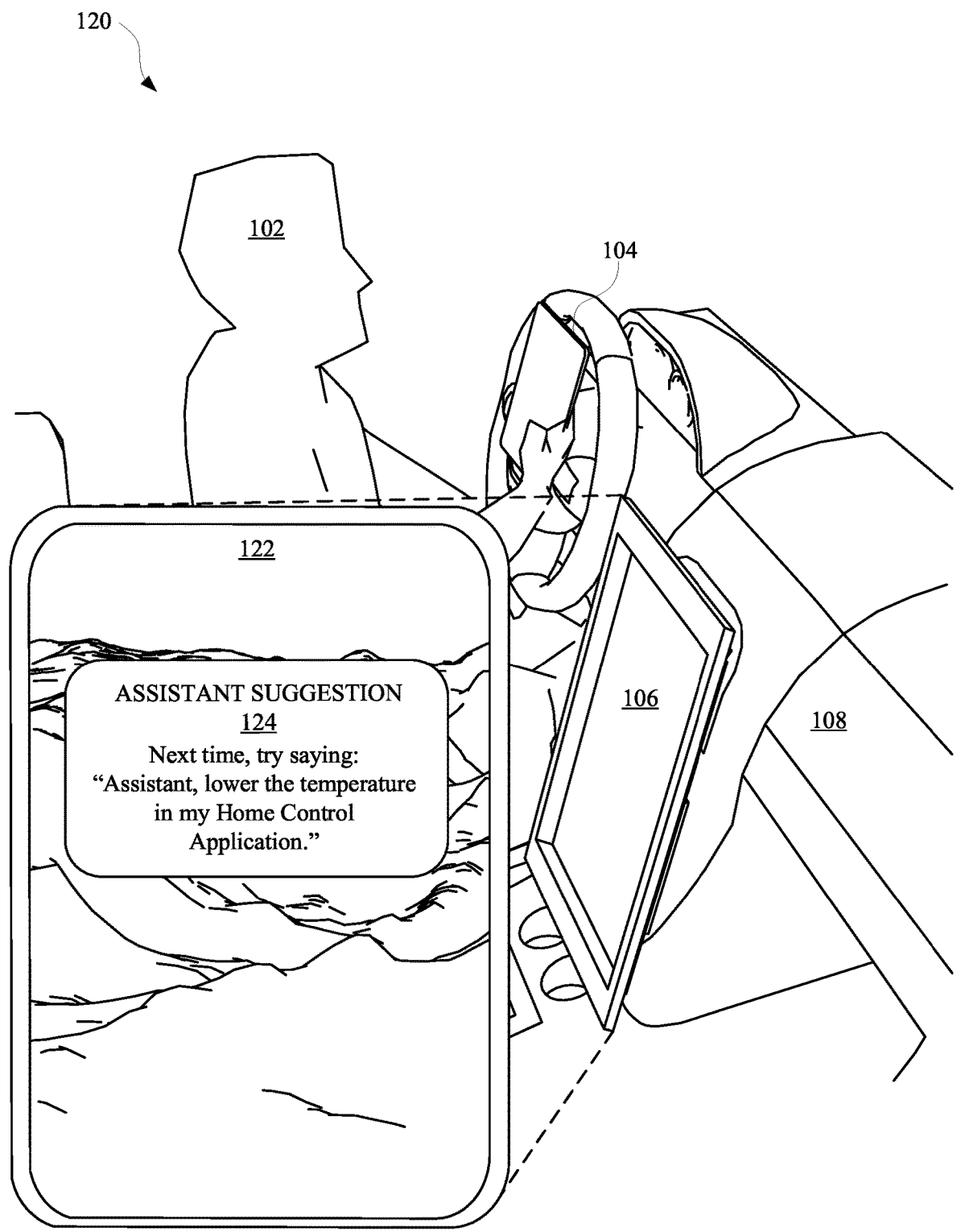

A portion of the screen content 110 occupied by the selectable GUI element can be identified, along with the natural language content, for utilization in generating the suggestion of the assistant input to be provided for presentation to the user 102. In this way, when the user 102 subsequently provides the assistant input included in the suggestion back to the automated assistant, the automated assistant can interact with the application interface of the IoT application to control the suggested feature, and/or communicate API data to the IoT application for controlling the suggested feature. For example, and as illustrated in FIG. 1B, the automated assistant can cause an assistant suggestion 124 to be rendered at a display interface 122 of the vehicle computing device 106 prior to the user 102 accessing the instance of the IoT application, while the user 102 is accessing the instance of the IoT application, and/or subsequent to the user 102 causing some action to be performed via the instance of the IoT application. For instance, assume that the user 102 manually interacts with the instance of the IoT application to cause a temperature at a home of the user 102 to be modified. Subsequent to the user 102 manually interacting with the instance of the IoT application, the automated assistant can render an assistant suggestion 124 that includes natural language content corresponding to a suggested assistant input. The suggested assistant input (i.e., suggested command phrase) can be, "Next time, try saying: 'Assistant, lower the temperature in my Home Control Application'", which can refer to a request for the automated assistant to automatically modify a temperature value that is managed by the instance of the IoT application (i.e., "Home Control Application"). For instance, the assistant suggestion 124 can be stored in association with a command to be submitted by the automated assistant to the IoT application, such as "lowerTemp(HomeControlApp, Assistant, [0, −3 degrees])." The automated assistant can additionally, or alternatively, provide other suggestions associated with the instance of the IoT application, such as "You can also say: (1) 'Assistant, open the garage'; and (2) 'Assistant, disarm the alarm system'", and/or any other actions that the automated assistant can perform on behalf of the user 102 by interfacing with the instance of the IoT application even though these other actions are not directly related to the manual interaction of the user 102 with the instance of the IoT application.

Figure 2:
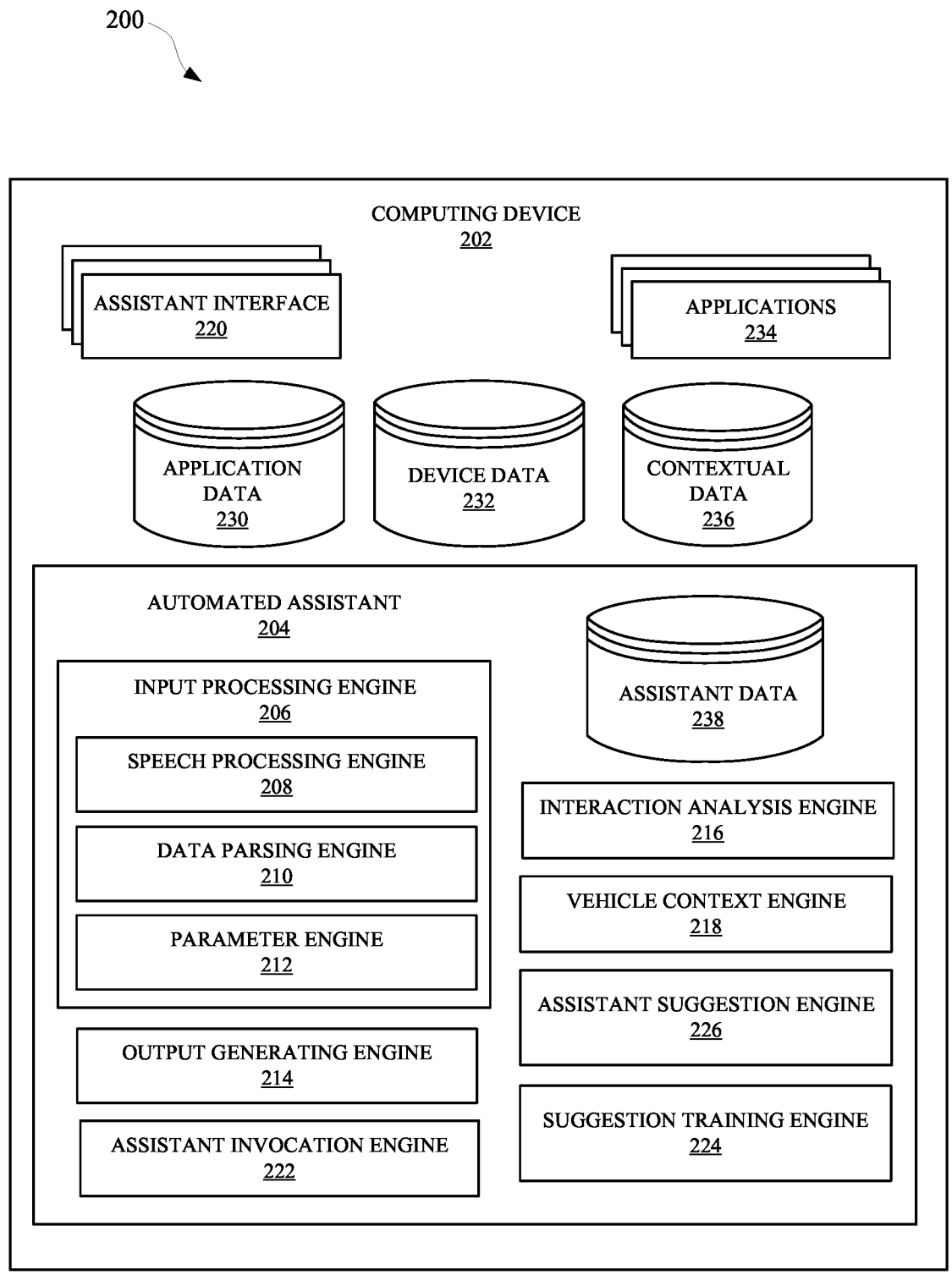
FIG. 2 illustrates a system that provides an automated assistant that can generate suggestions for invoking the automated assistant to control an application that may distract a user from driving their vehicle, in accordance with various implementations.

In some implementations, the suggestion 124 can be provided for presentation to the user 102 at the display interface 122 of the vehicle computing device 106 as shown in FIG. 2. In additional or alternative implementations, the suggestion 124 may additionally, or alternatively, be provided for presentation at a display interface of the portable computing device 104. Notably, in some implementations, the user 102 may not immediately utilize the suggestion 124. For example, when the user 102 is riding in their vehicle 108 and viewing the portable computing device 104, the user 102 may see the assistant suggestion 124 provided at the display interface 122 of the vehicle computing device 106 and place their phone down in acknowledgment of the ability of the automated assistant to control the IoT application. In this example, the user 102 may utilize the suggestion 124 the next time the user 102 would like to control one or more IoT devices utilizing the automated assistant. Alternatively, or additionally, the user 102 may see the assistant suggestion 124 during a first trip (e.g., excursion) in the vehicle 108, but not utilize the suggestion 124 until a second, subsequent trip in the vehicle 108. In other words, the user 102 may be driving to a first destination during the first trip, and be presented with the assistant suggestion 124, but not utilize the suggestion 124 until the second trip. Accordingly, rather than manually interacting with the various applications described herein, the user 102 can subsequently utilize the natural language content of the suggestion 124 to cause the automated assistant to perform some action on behalf of the user 102.

Figure 1C:
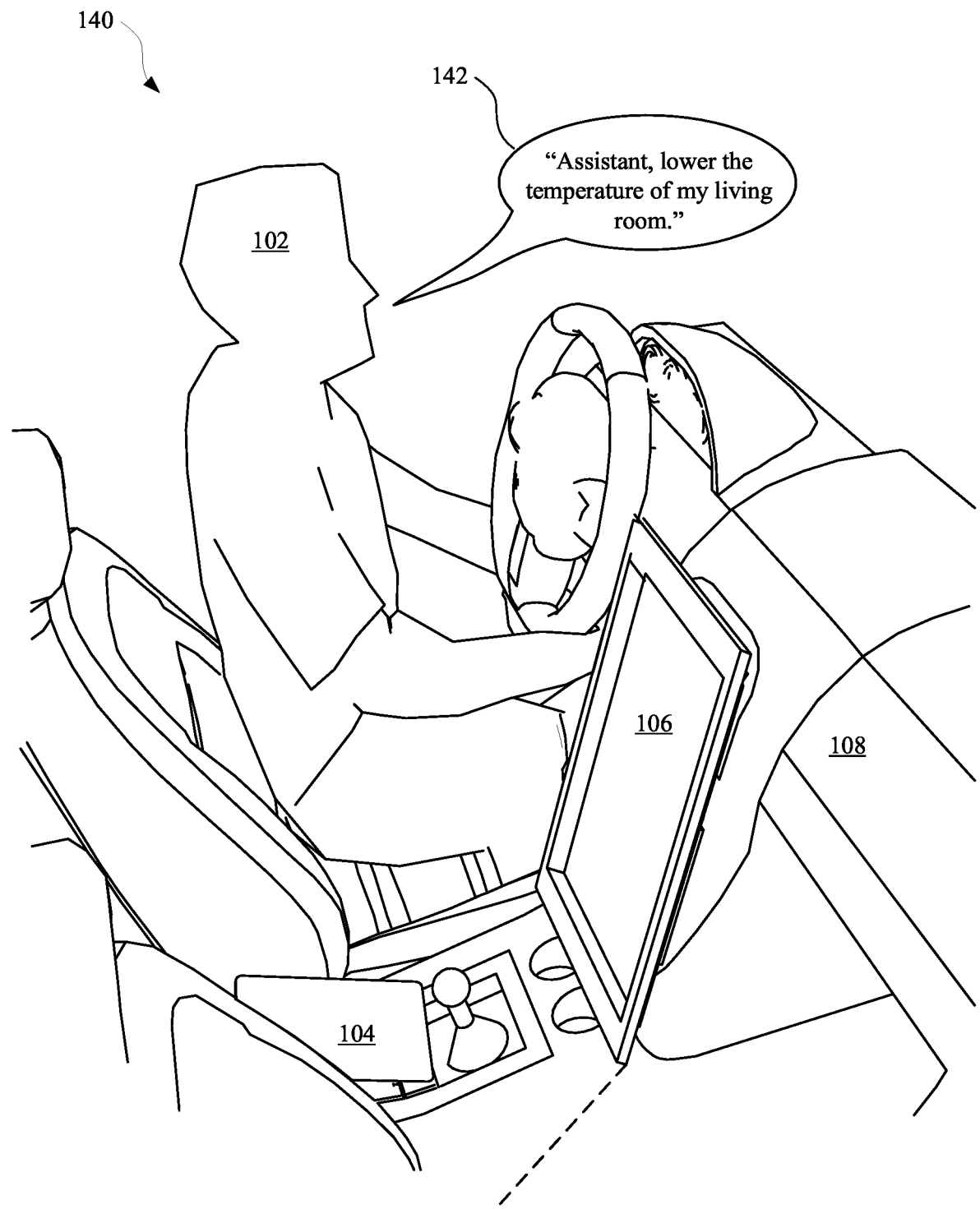

For example, and as illustrated in FIG. 1C, the user 102 can provide a spoken utterance 142, corresponding to the assistant suggestion 124, during the same trip as illustrated in FIG. 1A and FIG. 1B, or a subsequent trip (e.g., a trip during a day that is subsequent to the day from FIG. 1A and FIG. 1B). The spoken utterance 142 can be, "Assistant, lower the temperature of my living room," which can embody an invocation phrase (e.g., "Assistant") and a request or command phrase (e.g., "lower the temperature of my living room." Notably, the spoken utterance 142 provided by the user 102 is similar to the assistant suggestion 124, which included an invocation phrase (e.g., "Assistant") and a request or command phrase (e.g., "lower the temperature in my Home Control Application.") as shown in FIG. 1B. In some implementations, the user 102 can provide a spoken utterance that is similar to, but not exactly like, the natural language content of the assistant suggestion 124, but cause the operations corresponding to the assistant suggestion 124 to be performed. For instance, contextual data associated with an instance when the user 102 provides the spoken utterance 142 can be processed to generate a similarity value that can quantify a similarity of the contextual data to the prior instances (i.e., prior contexts) of when the assistant suggestion 124 was previously rendered.

Figure 1D:
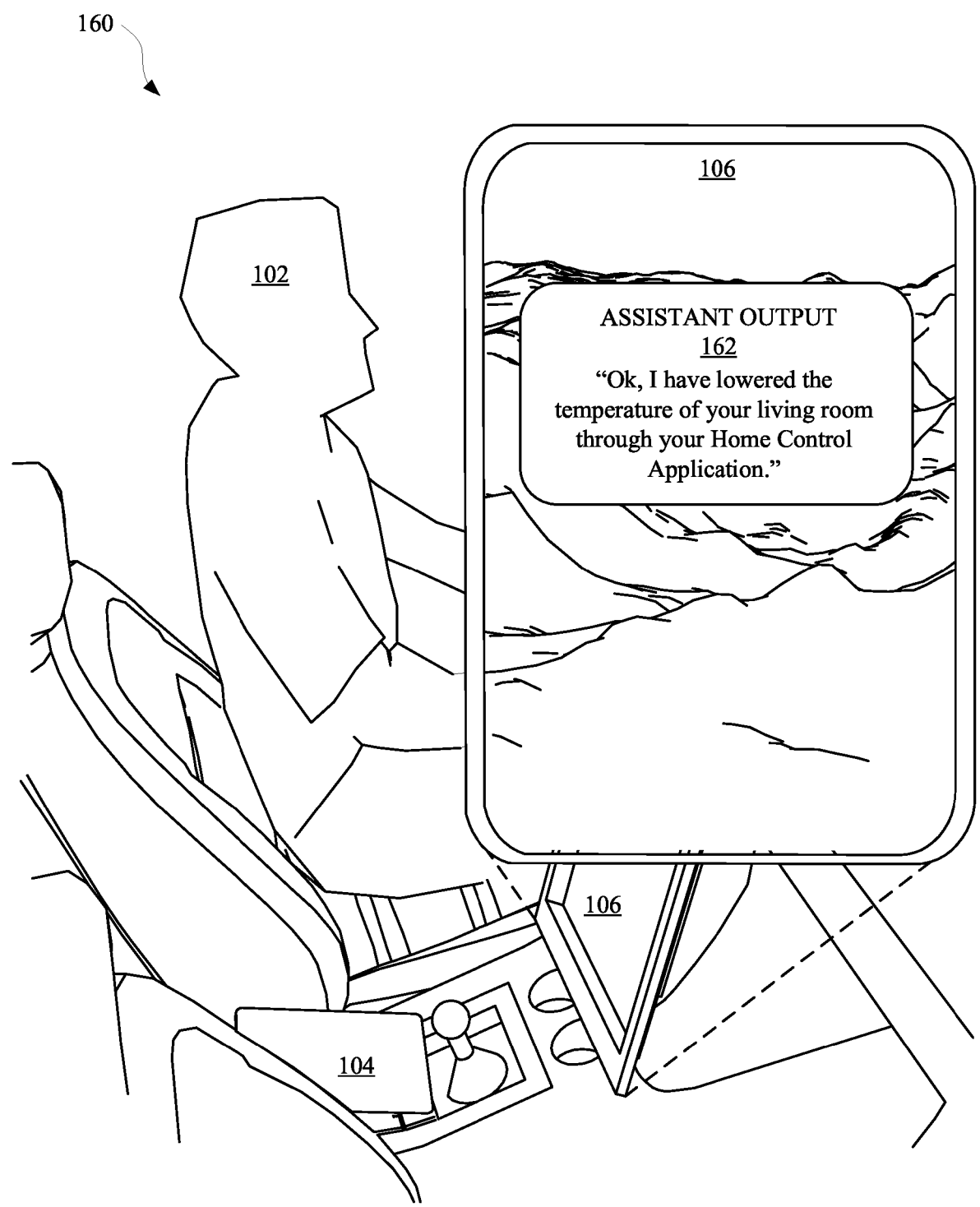

When the similarity value satisfies a similarity threshold, the automated assistant can respond to the spoken utterance 142 by initializing performance of one or more operations corresponding to the assistant suggestion 124 (e.g., lowering a temperature of a living room of the user 102 that is associated with the Home Control Application). For example, and as illustrated in FIG. 1D, the automated assistant can respond to the spoken utterance 142 by initializing performance of one or more operations in furtherance of fulfilling the request or command phrase, and optionally also rendering an assistant output 162 to provide an indication that one or more of the operations were performed. The assistant output 162 can be an audible output and/or textual output that conveys, to the user, that the automated assistant fulfilled the request or command phrase. For instance, the assistant output 162 can be text and/or audio embodying the message, "The temperature of your living room has been modified through the Home Control Application" as shown in FIG. 1C. In some implementations, training data can be generated based on this interaction between the user 102, the automated assistant, and/or the instance of the IoT application, in furtherance of training one or more trained machine learning models. The one or more trained machine learning models can then be utilized in subsequent contexts, for processing contextual data, to provide the user 102 with suggestions for safely streamlining interactions with the automated assistant and/or other applications.

Although the example described above with respect to FIGS. 1A, 1B, 1C, and 1D is described with respect to user 102 interacting with the IoT application via the portable computing device 104, it should be understood that is for the sake of example and is not meant to be limiting. For instance, the manual interaction with the instance of the IoT application may occur via the vehicle computing device 106 rather than the portable computing device 104 as described. In this instance, the suggestion 124 may be provided via the vehicle computing device 106 in the same or similar manner described above. Also, for instance, the user 102 may additionally, or alternatively, interact with other applications via the portable computing device 104 and/or the vehicle computing device 106, and suggestions can be generated for those other applications in the same or similar manner. For example, the user 102 can interact with an instance of a media application via the vehicle computing device 106 to cause a song to be provided for playback. In some of these examples, when the user 102 opens the instance of the music application, a suggestion of, for example, "Tell me what song or artist you would like to hear" may be provided for audible and/or visual presentation to the user 102. Accordingly, the user 102 can simply provide a reference to a song or artist that he/should would like to hear, rather than navigating through the instance of the media application to cause music to be played back. In other examples, the suggestion may not be provided until after the user manually selects a song or artist that they would like to hear and the song or artist is played back.

FIG. 2 illustrates a system 200 that provides an automated assistant 204 that can provide suggestions for invoking the automated assistant 204 to control an application that the user may access from their vehicle (e.g., via the portable computing device 104 and/or via the vehicle computing device 106 from FIGS. 1A-1D). The automated assistant 204 can operate as part of an automated assistant application that is provided at one or more computing devices, such as a computing device 202 and/or a server device. A user can interact with the automated assistant 204 via automated assistant interface(s) 220, which can be a microphone, a camera, a touch screen display, a user interface, and/or any other apparatus capable of providing an interface between a user and an application. For instance, a user can initialize the automated assistant 204 by providing a verbal, textual, gestural, and/or a graphical input to an assistant interface 220 to cause the automated assistant 204 to initialize one or more actions (e.g., provide data, control a peripheral device, access an agent, generate an input and/or an output, and/or other actions). Alternatively, the automated assistant 204 can be initialized based on processing of contextual data 236 using one or more trained machine learning models and/or heuristics processes. The contextual data 236 can characterize one or more features of an environment in which the automated assistant 204 is accessible (e.g., one or more features of the computing device 202 and/or one or more features of a vehicle in which a user is located), and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices (e.g., that are provided by an entity that is in addition to an entity that provides the computing device 202 and/or the automated assistant 204) can be in communication with a server device over a network, such as the internet. Additionally, the computing device 202 and any other computing devices can be in communication with each other over a local area network (LAN), such as a Wi-Fi network or Bluetooth network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated automated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text corresponding to a spoken utterance that is embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include an automatic speech recognition (ASR) algorithm, which can employ neural networks, and/or statistical models for identifying groups of audio data corresponding to words or phrases. The text converted from the audio data (or text received as textual input) can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

The automated assistant application includes, and/or has access to, on-device ASR, on-device natural language understanding (NLU), and on-device fulfillment. For example, on-device ASR can be performed using an on-device ASR module that processes audio data (detected by the microphone(s)) using, for example, an end-to-end speech recognition machine learning model stored locally at the computing device 202. The on-device ASR module generates recognized text for spoken utterances (if any) present in the audio data. Further, on-device NLU can be performed using an on-device NLU module that processes recognized text, generated using the on-device speech recognition, and optionally contextual data, to generate NLU data. The NLU data can include intent(s) that correspond to the spoken utterance and optionally parameter(s) (e.g., slot values) for the intent(s). Moreover, on-device fulfillment can be performed using an on-device fulfillment module that utilizes the NLU data (from the on-device NLU module), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment module can then initiate local and/or remote performance/execution of the determined action(s) to resolve the spoken utterance.

In various implementations, remote ASR, remote NLU, and/or remote fulfillment can at least selectively be utilized. For example, recognized text generated by the on-device ASR module can at least selectively be transmitted to remote automated assistant component(s) for remote NLU and/or remote fulfillment. For instance, the recognized text generated by the on-device ASR module can optionally be transmitted for remote performance in parallel with on-device performance, or responsive to failure of on-device NLU and/or on-device fulfillment. However, on-device ASR, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a first-party entity that is the same entity that provided the computing device 202 and/or the automated assistant 204 and/or provided by a third-party entity that is different from an entity that provided the computing device 202 and/or the automated assistant 204. An application state engine (not depicted) of the automated assistant 204 and/or the computing device 202 can access application data 230 to determine one or more actions capable of being performed by the one or more applications 234, as well as a state of each application of the one or more applications 234 and/or a state of a respective device that is associated with the one or more applications 234. A device state engine (not depicted) of the automated assistant 204 and/or the computing device 202 can access device data 232 to determine one or more actions capable of being performed by the computing device 202 and/or one or more devices that are associated with the computing device 202 and/or the one or more applications 234. Furthermore, the application data 230 and/or any other data (e.g., the device data 232) can be accessed by the automated assistant 204 to generate contextual data 236, which can characterize a context in which a particular application of the one or more applications 234 and/or device is executing, and/or a context in which a particular user is accessing the computing device 202, accessing a particular application of the one or more applications 234, and/or any other device or module.

While the one or more applications 234 are executing at the computing device 202, the device data 232 can characterize a current operating state of each of the one or more applications 234 executing at the computing device 202. Furthermore, the application data 230 can characterize one or more features of the one or more applications 234 while executing, such as content of one or more graphical user interfaces being rendered at the direction of the one or more applications 234. Alternatively, or additionally, the application data 230 can characterize an action schema, which can be updated by a respective one of the one or more applications 234 and/or by the automated assistant 204, based on a current operating status of the respective application. Alternatively, or additionally, one or more action schemas for the one or more applications 234 can remain static, but can be accessed by the application state engine in order to determine a suitable action to initialize via the automated assistant 204.

The computing device 202 can further include an assistant invocation engine 222 that can use one or more trained machine learning models to process inputs received via the assistant interface 220, the application data 230, the device data 232, the contextual data 236, and/or any other data that is accessible to the computing device 202. The assistant invocation engine 222 can process this data in order to determine whether or not to wait for a user to explicitly speak an invocation phrase to invoke the automated assistant 204 via the assistant interface 220, or consider the data to be indicative of an intent by the user to invoke the automated assistant—in lieu of requiring the user to explicitly speak the invocation phrase to invoke the automated assistant 204. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant 204. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can further include an interaction analysis engine 216, which can process various data for determining whether an interaction between a user and an application should be the subject of an assistant suggestion. For example, the interaction analysis engine 216 can process data that indicates a number of user inputs that a user provided to an application 234 to cause the application 234 to perform a particular operation while the user is in a respective vehicle. Based on this processing, the interaction analysis engine 216 can determine whether the automated assistant 204 can effectuate performance of the particular operation with less inputs from the user. For example, a user that switches between corresponding instances of a given application at their portable computing device to cause certain media to be rendered at their vehicle computing device may be able to cause the same media to be rendered by issuing a particular spoken utterance (e.g., a single input) to the automated assistant 204.

Further, a vehicle context engine 218 can determine when to render a corresponding assistant suggestion for the user based on the determination made by the interaction analysis engine 216 that the particular operation can be initialized via the automated assistant 204 and with fewer inputs. For example, the vehicle context engine 218 can process data from one or more different sources to determine a suitable time, location, and/or computing device to render the assistant suggestion for the user. For example, the application data 230 can be processed to determine whether the user has switched between applications at their vehicle computing device and/or portable computing device in furtherance of causing certain media to be rendered. In response to this determination, the vehicle context engine 218 can determine that this instance of switching applications is suitable for rendering an assistant suggestion regarding invoking the automated assistant to interact with a particular application (e.g., the application for rendering media via a suggestion of "Next time, just say 'Open media application'") to cause the particular operation to be performed. Alternatively, or additionally, data from one or more different sources can be processed using one or more heuristic processes and/or one or more trained machine learning models to determine a suitable time, location, and/or computing device to render a particular assistant suggestion. The data can be periodically and/or responsively processed to generate an embedding or other lower-dimensional representation, which can be mapped to a latent space in which other existing embeddings have been previously mapped. When the generated embedding is determined to be a threshold distance away from an existing embedding in the latent space, the assistant suggestion corresponding to that existing embedding can be rendered for the user.

In some implementations, the system 200 can further include an assistant suggestion engine 226, which can generate assistant suggestions based on interactions between a user and one or more applications and/or devices. For example, the application data 230 can be processed by the assistant suggestion engine 226 to determine one or more operations capable of being initialized by a particular application of the one or more applications 234. Alternatively, or additionally, interaction data can be processed to determine whether the user has previously initialized performance of one or more operations of the particular application of the one or more applications 234. The assistant suggestion engine 234 can determine whether the automated assistant 204 is capable of initializing the one or more operations in response to an assistant input from the user that is directed to the automated assistant 204. For example, an API for a particular application of the one or more applications 234 can be accessed by the automated assistant 204 for determining whether an API command can be utilized by the automated assistant 204 to control a particular operation of the particular application of the one or more applications 234. When the automated assistant 204 identifies an API command for controlling a particular operation that the user may be interested in, the assistant suggestion engine 226 can generate a request or command phrase and/or other assistant input that can be rendered as an assistant suggestion for the user. For example, the automated assistant 204 can generate a suggestion of "Assistant, play my recent podcast" based on determining that an API call (e.g., playMedia(Podcast Application, 1, resume_playback( )) can be utilized by the automated assistant to control a particular application feature of interest to the user, and where "Assistant" in this suggestion corresponds to an invocation phrase for the automated assistant 204 and "play my recent podcast" corresponds to the request or command phrase that, when detected, causes the automated assistant 204 to perform an operation on behalf of the user.

In some implementations, the automated assistant 204 can cause the assistant suggestion to be rendered while the user interacts with the one or more applications 234, before the user interacts with the one or more applications 234, in response to completion of a particular application operation via the one or more applications 234, and/or before completion of the particular application operation via the one or more applications 234. In some implementations, an assistant suggestion can be generated and/or rendered based on whether a user is an owner of the vehicle, a driver of the vehicle, a passenger in the vehicle, a borrower of the vehicle, and/or any other person that can be associated with a vehicle. The automated assistant 204 can determine whether the user located in the vehicle belongs in one or more of these categories using any known technique (e.g., speaker identification, face identification, password identification, fingerprint identification, and/or other techniques). For instance, the automated assistant 204 can render assistant suggestions that are more personalized for an owner when an owner is driving the vehicle, and render other assistant suggestions that may be useful to a broader audience for passengers and/or borrowers of the vehicle. The automated assistant 204 can operate such that, a determined familiarity of a user with various automated assistant features can be indirectly proportional to a frequency by which assistant suggestions are rendered for that user. For example, if a given suggestion has already been provided for presentation to the user of the vehicle, then the given suggestion may not be subsequently provided for presentation to the user, but may be subsequently provided for presentation to another user that utilizes the vehicle (e.g., a borrower of the vehicle).

In some implementations, the system 200 can further include a suggestion training engine 224, which can be utilized to generate training data that can be used to train one or more different machine learning models, which can be used for providing assistant suggestions to different users associated with a vehicle. Alternatively, or additionally, the suggestion training engine 224 can generate training data based on whether or not a particular user interacted with a rendered assistant suggestion. In this way, one or more models can be further trained to provide assistant suggestions that the user considers relevant, and avoid distracting the user with too many suggestions that the user may not have a strong interest in and/or may already be aware of.

In some implementations, assistant suggestions can embody a command phrase that, when detected by the automated assistant 204, causes the automated assistant 204 to interact with the one or more applications 234 to effectuate performance of one or more different operations and/or routines. Alternatively, or additionally, multiple different assistant suggestions can be rendered concurrently, for a particular application of the one or more applications 234 and/or for multiple applications of the one or more applications 234, thereby allowing the user to learn multiple different command phrases at a time for controlling the one or more applications 234. In some implementations, assistant suggestions can be rendered more for borrowers of a vehicle compared to an owner of a vehicle. A determination to render more assistant suggestions for a borrower and/or other guest can be based on a frequency by which an owner of the vehicle utilizes the automated assistant 204 via the vehicle computing device. In other words, the assistant suggestion engine 226 may cause fewer assistant suggestions to appear for a user who frequently uses features of their automated assistant 204, and more assistant suggestions for a user (with prior permission from the user) who does not frequently use features of the automated assistant 204. As noted above, the owner of the vehicle can be differentiated from other users using various techniques.

Figure 3:
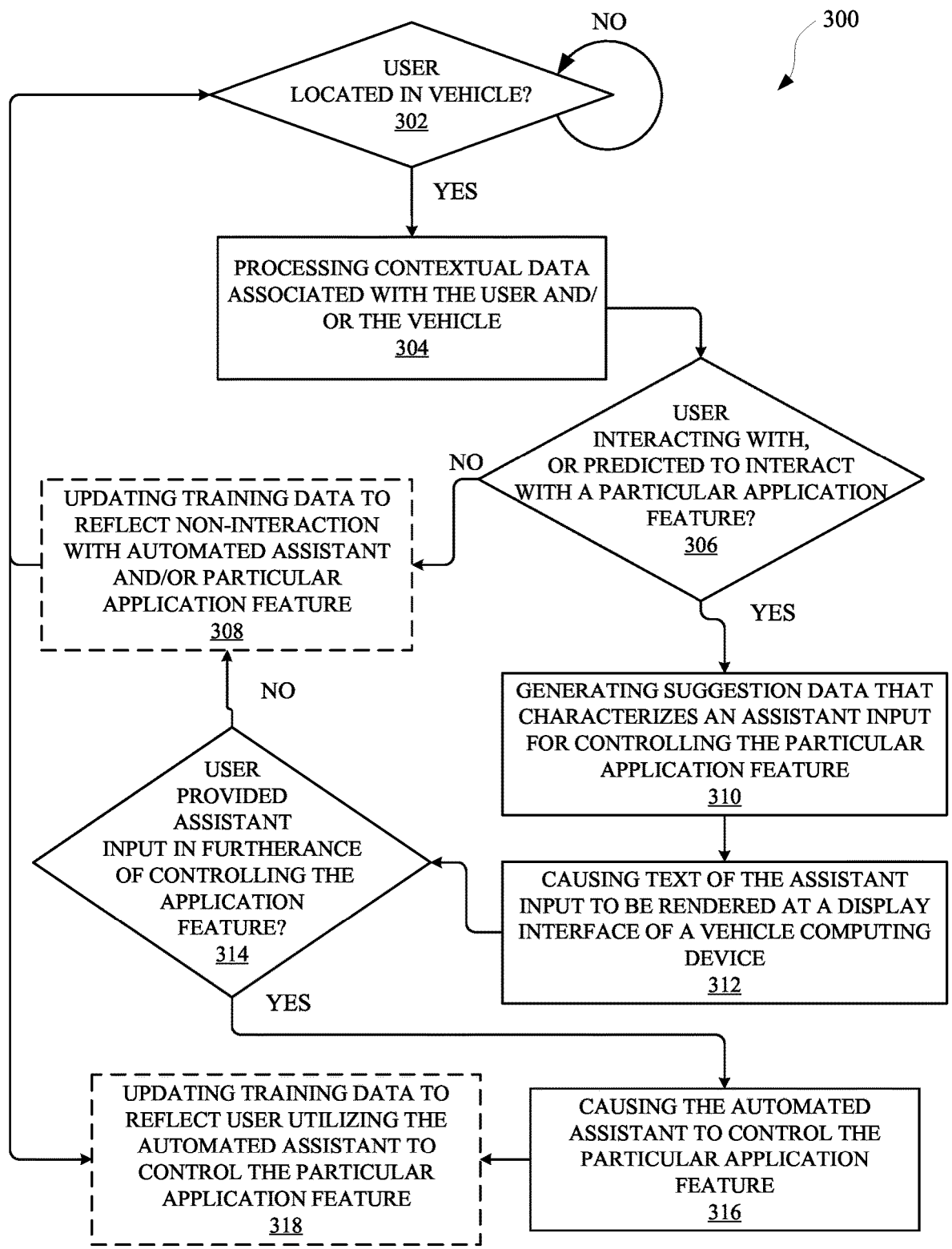
FIG. 3 illustrates a method for providing an automated assistant that can generate suggestions for assistant inputs that can be provided by the user in furtherance of causing the automated assistant to control a separate application while the user is in a vehicle, in accordance with various implementations.

FIG. 3 illustrates a method 300 for providing an automated assistant that can generate suggestions for assistant inputs that can be provided by the user in furtherance of causing the automated assistant to control an application while the user is in a vehicle. The method 300 can be performed by one or more computing devices, applications, and/or any other apparatus or module that can be associated with an automated assistant. The method 300 can include an operation 302 of determining whether a user is located within a vehicle. The vehicle can be, for example, a vehicle that includes a vehicle computing device, which can provide access to the automated assistant. The automated assistant can determine that the user is within the vehicle based on data from one or more different sources, such as the vehicle computing device, a portable computing device (e.g. a computer that the user may bring into the car with them), and/or any other device that can be in communication with the automated assistant. For instance, device data can indicate that the user has entered the vehicle, at least based on the device data indicating that a portable computing device, (e.g., a cellular phone) owned by the user, is paired (e.g., via Bluetooth protocol) with the vehicle computing device. Alternatively, or additionally, the automated assistant can determine that the user is located within the vehicle based on contextual data, which can characterize a context of the user at a particular time. For instance, a calendar entry can indicate that the user will be driving to class when the automated assistant is determining whether the user is in the vehicle. Based on this indication, the automated assistant can use one or more heuristic processes and/or one or more trained machine learning models to determine whether the user is likely (e.g., to a threshold degree of probability) to be located within the vehicle. Alternatively, or additionally, one or more sensors of the vehicle that are coupled to the vehicle computing device of the vehicle can generate sensor data that indicates the user is located in the vehicle (e.g., via an occupancy sensor).

The method 300 can proceed from the operation 302 to an operation 304, which can include processing contextual data associated with the user and/or or the vehicle. In some implementations, the contextual data can include an identifier for the user (e.g., a username, a user account, and/or any other identifier), an identifier for the vehicle (e.g., a type of vehicle, a name for the vehicle, an original equipment manufacturer (OEM) of the vehicle, etc.), and/or a location of the vehicle. Alternatively, or additionally, the contextual data can include device data, application data, and/or any other data that can indicate a device and/or application that: the user recently interacted with, is currently interacting with, and/or is expected to interact with. Alternatively, or additionally, application data can indicate that the user has recently developed a habit of accessing a real estate application each morning, in order to view an application page of "recent listings."

The method 300 can proceed from the operation 304 to an operation 306 of determining whether the user is interacting with, or is predicted to interact with, a particular application and/or application feature. When the user is not determined to be interacting with, or is not predicted to interact with, a particular application, the method 300 can proceed from the operation 306 to an optional operation 308 of updating training data. The training data can be updated to reflect non-interaction with the automated assistant and/or a particular application feature when the user is within the vehicle. In this way, subsequent processing of contextual data using one or more trained machine learning models trained from the updated training data can provide more relevant and/or helpful suggestions to the user. Otherwise, when the user is determined to be interacting with, or is predicted to interact with, a particular application feature, the method 300 can proceed from the operation 306 to an operation 310.

The operation 310 can include generating suggestion data that characterizes an assistant input for controlling the particular application feature. For instance, the suggestion data can be generated using an application programming interface (API) that can allow the automated assistant to submit to, and/or receive from, the particular application actionable requests. Alternatively, or additionally, the automated assistant can process HTML code, XML code, document object model (DOM) data, application programming interface (API) data, and/or any other information that can indicate whether certain features of an application are controllable. Based on this determination, the automated assistant can generate one or more suggestions for spoken utterances that, when subsequently submitted by the user, causes the automated assistant to control one or more features of the particular application. For instance, the automated assistant can determine that accessing the "recent listings" page of the real estate application involves opening the real estate application and selecting a selectable GUI element labeled "Recent Listings." Based on this determination, the automated assistant can generate one or more executable requests for the real estate application, and textual content corresponding to a spoken utterance that, when provided by the user, causes the automated assistant to submit the executable requests to the real estate application. The one or more requests and/or textual content can then be stored as suggestion data, which can be used for rendering suggestions for one or more users. When the user provides the spoken utterance, and the automated assistant provides the one or more requests to the real estate application. The real estate application can respond by generating the "recent listings" page, and the automated assistant can cause the "recent listings" page to be rendered at a display interface of the vehicle computing device. Alternatively, or additionally, the automated assistant can render an audible output that characterizes content of the "recent listings" page.

The method 300 can proceed from the operation 310 to an operation 312, which can include causing text of the spoken utterance to be rendered at the display interface of the vehicle computing device, and/or another computing device associated with the user (e.g., a portable computing device associated with the user). For instance, and in accordance with the aforementioned example, the automated assistant can cause a suggestion GUI element (that is optionally selectable) to be rendered at the display interface of the vehicle computing device while the user is within the vehicle. The suggestion GUI element can be rendered with natural language content characterizing the spoken utterance, such as "Assistant, show me recent listings." In some implementations, the automated assistant can render the request suggestion without a particular identifier for the application to be controlled. Rather, the suggestion can be generated such that the user should be able to correlate the suggestion to a context of the suggestion and infer the application to be controlled. In some implementations, the user can initialize the communication of the request from the automated assistant to the real estate application by providing the spoken utterance and/or tapping a touch interface of the vehicle computing device. For example, the display interface of the vehicle computing device can be responsive to touch inputs, and/or one or more buttons (e.g., a button on a steering wheel), switches, and/or other interfaces of the vehicle computing device can be responsive to touch inputs. One or more of these types of touch inputs can be utilized to initialize performance of one or more operations corresponding to one or more suggestions from the automated assistant.

The method 300 can proceed from the operation 312 to an operation 314 of determining whether the user provided an assistant input in furtherance of controlling the application feature. For example, the user can provide a spoken utterance, such as, "Assistant, show me recent listings," in furtherance of causing the automated assistant to control the real estate application. When the automated assistant receives the assistant input, the method 300 can proceed from the operation 314 to an operation 316, which can include causing the automated assistant to control the particular application feature. Otherwise, when the user does not provide an assistant input corresponding to the suggestion from the automated assistant, the method 300 can proceed from the operation 314 to the optional operation 308.

In some implementations, when the user provides the assistant input corresponding to the suggestion, the method 300 can proceed from the operation 316 to an optional operation 318. The optional operation 318 can include updating training data based on the user utilizing the automated assistant to control the particular application feature. For instance, training data can be generated based on the user providing the assistant input, and the training data can be utilized to train one or more trained machine learning models. The one or more trained machine learning models can be subsequently used to process contextual data when the user, or another user, is determined to be in their vehicle. This additional training of the one or more trained machine learning models can allow the automated assistant to provide more relevant and/or effective suggestions for the user to invoke their automated assistant to control one or more separate applications, while also encouraging safe driving habits.

Figure 4:
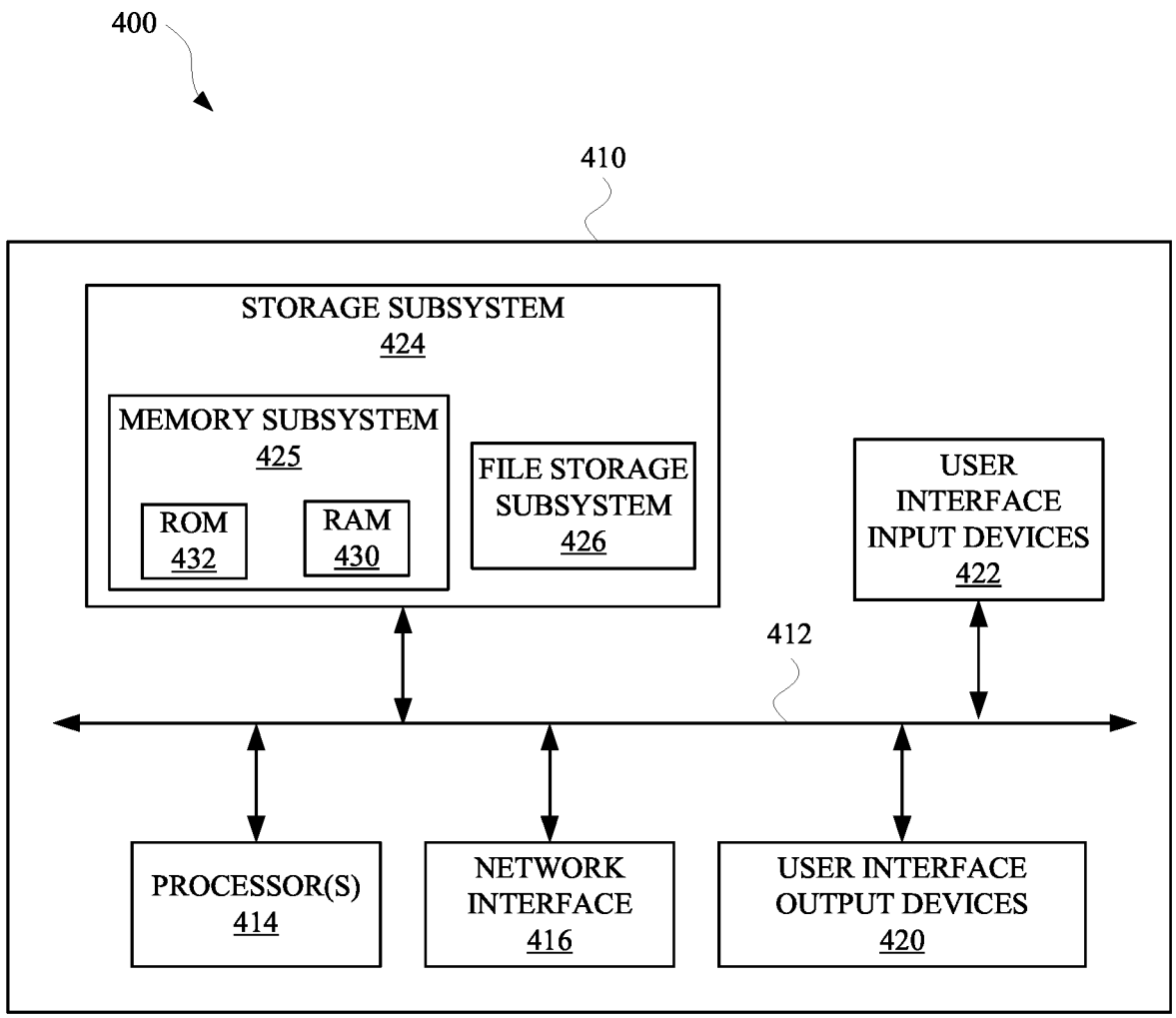
FIG. 4 is a block diagram of an example computer system, in accordance with various implementations.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, vehicle computing device 106, portable computing device 104, and/or any other application, assistant, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes determining that a user is engaging in an interaction with a given mobile application via a mobile computing device that is located in a vehicle with the user. The given mobile application is separate from an automated assistant application, and the automated assistant application is accessible via the mobile computing device and a vehicle computing device of the vehicle. The method further includes generating, based on the interaction with the given mobile application, suggestion data that characterizes a command phrase that, when submitted by the user and to the automated assistant application, causes the automated assistant application to control a particular operation of a given vehicular application. The given vehicular application is a counterpart of the given mobile application. The method further includes causing, based on the suggestion data, the command phrase to be visually rendered in a foreground of a display interface of the vehicle computing device.

These and other implementations of technology disclosed herein can optionally include one or more of the following features.

In some implementations, generating the suggestion data may be performed at the mobile computing device, and the method may further include providing, in response to the interaction with the given mobile application, the suggestion data to the vehicle computing device.

In some implementations, generating the suggestion data may be performed at the vehicle computing device, and the method may further include receiving, from the given mobile application, interaction data that characterizes the interaction between the user and the given mobile application. The suggestion data may be generated further based on the interaction data.

In some implementations, the command phrase may be visually rendered as a selectable graphical user interface (GUI) element at the display interface, and the selectable GUI element may be selectable via touch input received at an area of the display interface corresponding to the selectable GUI element.

In some implementations, generating the suggestion data that characterizes the command phrase may include generating the command phrase based on one or more application operations that can be initialized via direct interaction between the user and a GUI interface of the given mobile application. The GUI interface may be being rendered at the mobile computing device, and the one or more application operations include the particular operation.

In some implementations, generating the suggestion data that characterizes the command phrase may include generating the command phrase based on one or more application operations that the user initialized via the given mobile application of the mobile computing device during one or more prior instances when the user was located in the vehicle. The one or more application operations may include the particular operation.

In some implementations, a method implemented by one or more processors is provided, and includes generating prediction data that indicates a user is predicted to interact with an application interface of a given application, and via a display interface of a vehicle computing device, to control a feature of the given application. The given application is separate from an automated assistant application that is accessible via the vehicle computing device of a vehicle. The method further includes generating, based on the prediction data, suggestion data that characterizes a command phrase that, when submitted by the user to the automated assistant application, causes the automated assistant application to control the feature of the given application; causing at least the command phrase to be rendered at the display interface of the vehicle computing device prior to the user interacting with the feature of the application; and in response to causing at least the command phrase to be rendered at the display interface of the vehicle computing device: receiving, from the user, an assistant input that is directed to the automated assistant application and that includes at least the command phrase, and causing, based on receiving the assistant input, the automated assistant application to control the feature of the given application based on the assistant input.

These and other implementations of technology disclosed herein can optionally include one or more of the following features.

In some implementations, the command phrase may be rendered as a selectable graphical user interface (GUI) element at the display interface, and the assistant input may be a touch input that is received at an area of the display interface corresponding to the selectable GUI element. In some versions of those implementations, generating the prediction data may include determining that the vehicle will be driving towards a location when the user is predicted to interact with the application interface and control the feature of the application. The suggestion data may be further based on the location that the vehicle is driving towards.

In some implementations, the method may further include determining that the application interface of the given application is being rendered at the display interface of the vehicle computing device. Generating the prediction data may be performed in response to determining that the application interface is being rendered at the display interface of the vehicle computing device.

In some implementations, the method may further include determining that the user is currently located within the vehicle, and determining that, during a prior instance when the user was located within the vehicle, the user accessed the application interface of the given application. Generating the prediction data may be performed based on determining that the user is currently located within the vehicle and that the user previously accessed the application interface of the given application.

In some implementations, the method may further include processing contextual data using one or more trained machine learning models. The contextual data may characterize one or more features of a context of the user, and generating the prediction data may be performed based at least on processing the contextual data. In some versions of those implementations, the one or more trained machine learning models may be trained using data generated during one or more prior instances in which one or more other users accessed, while in a respective vehicle, the feature of the given application.

In some implementations, a method implemented by one or more processors is provided, and includes determining, by a vehicle computing device of a vehicle, that a user is engaging in an interaction with a given application of the vehicle computing device while the user is in the vehicle. The given application is separate from an automated assistant application that is accessible via the vehicle computing device. The method further includes generating, by the vehicle computing device, and based on the interaction with the given application, suggestion data that characterizes a command phrase that, when submitted by the user and to the automated assistant application, causes the given application to perform a particular operation associated with the interaction between the user and the given application; and causing, by the vehicle computing device, the suggestion data to be visually rendered at a display interface of the vehicle computing device. The command phrase is rendered in a foreground of the display interface of the vehicle computing device.

These and other implementations of technology disclosed herein can optionally include one or more of the following features.

In some implementations, the command phrase may include natural language content that characterizes an invocation phrase for invoking the automated assistant application and a request to perform the particular operation. In some versions of those implementations, the method may further include receiving, by the vehicle computing device, a spoken utterance that is directed to the automated assistant application and embodies the request; determining, by the vehicle computing device, that the spoken utterance includes the request rendered at the display interface of the vehicle computing device; and causing, in response to receiving the spoken utterance, the given application to perform the particular operation associated with the interaction between the user and the given application. In some further versions of those implementations, the command phrase may be rendered when the user is in the vehicle during a first excursion; and the spoken utterance may be received when the user is in the vehicle during a second excursion.

In some implementations, the method may further include determining that the particular operation is capable of being controlled via selectable content that is being rendered at the display interface of the vehicle computing device. Generating the suggestion data that characterizes the command phrase may be based on determining that the particular operation is capable of being controlled via the selectable content that is being rendered at the display interface of the vehicle computing device. In some versions of those implementations, the application may be a communication application and the selectable content includes one or more selectable elements for specifying a phone number and/or a contact to call. In additional or alternative versions of those implementations, the application may be a media application and the selectable content includes one or more selectable elements for specifying media to be visually rendered via the display interface of the vehicle computing device and/or audibly rendered via one or more speakers of the vehicle computing device.

In some implementations, causing the suggestion data to be rendered at the display interface of the vehicle computing device may be in response to determining that the user has completed the interaction with the given application of the vehicle computing device.

In some implementations, generating the suggestion data that characterizes the command phrase may be further based on a context of the user that is engaging in the interaction with the given application of the vehicle computing device. In some versions of those implementations, generating the suggestion data that characterizes the command phrase may be further based on a display context of the display interface of the vehicle computing device.

In some implementations, the method may further include, subsequent to the command phrase being rendered at the display interface of the vehicle computing device: determining, by the vehicle computing device, that the user is engaging in a separate interaction with an additional application of the vehicle, and via the display interface of the vehicle computing device, while the user is in the vehicle. The additional application may also be separate from the automated assistant application and may also be separate from the given application. The method may further include generating, by the vehicle computing device, and based on the separate interaction with the additional application, additional suggestion data that characterizes an additional command phrase that, when submitted by the user and to the automated assistant application, causes the automated assistant application to control an additional operation of the additional application; and causing, by the vehicle computing device, the additional suggestion data to be visually rendered at the display interface of the vehicle computing device. In some versions of those implementations, causing the additional suggestion data to be rendered at the display interface of the vehicle computing device may be performed in response to determining that the user has completed the separate interaction with the additional application of the vehicle computing device.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:
1. A method implemented by one or more processors, the method comprising:
   determining that a user is engaging in a manual interaction with a given mobile application via a mobile computing device that is located in a vehicle with the user,
      wherein the given mobile application is separate from an automated assistant application,
      wherein the automated assistant application is accessible via the mobile computing device and a vehicle computing device of the vehicle, and
      wherein the manual interaction with the given mobile application is via a touch interface of the mobile computing device; and
   in response to determining that the user has completed the manual interaction with the given mobile application via the mobile computing device:
      generating, based on the manual interaction with the given mobile application, suggestion data that characterizes a command phrase that, when submitted by the user and to the automated assistant application, causes the automated assistant application to control a particular operation of a given vehicular application,
         wherein the given vehicular application is a counterpart of the given mobile application, and
         wherein generating the suggestion data is performed at the mobile computing device; and
      providing the suggestion data to the vehicle computing device, wherein providing the suggestion data to the vehicle computing devices causes the command phrase to be visually rendered in a foreground of a display interface of the vehicle computing device.

2. The method of claim 1, wherein the command phrase is visually rendered as a selectable graphical user interface (GUI) element at the display interface, and the selectable GUI element is selectable via touch input received at an area of the display interface corresponding to the selectable GUI element.

3. The method of claim 1, wherein generating the suggestion data that characterizes the command phrase includes:
   generating the command phrase based on one or more application operations that can be initialized via direct interaction between the user and a GUI interface of the given mobile application,
      wherein the GUI interface is being rendered at the mobile computing device, and the one or more application operations include the particular operation.

4. The method of claim 1, wherein generating the suggestion data that characterizes the command phrase includes:
   generating the command phrase based on one or more application operations that the user initialized via the given mobile application of the mobile computing device during one or more prior instances when the user was located in the vehicle,
      wherein the one or more application operations include the particular operation.

5. A method implemented by one or more processors, the method comprising:
   generating prediction data that indicates a user is predicted to manually interact with an application interface of a given application, and via a display interface of a vehicle computing device, to control a feature of the given application,
      wherein the given application is separate from an automated assistant application that is accessible via the vehicle computing device of a vehicle, and
      wherein generating the prediction data comprises:
         determining that the vehicle will be driving towards a location when the user is predicted to interact with the application interface and control the feature of the application; and
   prior to the user manually interacting with the application interface of the given application:
      generating, based on the prediction data and based on the location that the vehicle is driving towards, suggestion data that characterizes a command phrase that, when submitted by the user to the automated assistant application, causes the automated assistant application to control the feature of the given application;
      causing at least the command phrase to be rendered at the display interface of the vehicle computing device prior to the user manually interacting with the feature of the application, wherein the command phrase is rendered as a selectable graphical user interface (GUI) element at the display interface; and
      in response to causing at least the command phrase to be rendered at the display interface of the vehicle computing device:
         receiving, from the user, an assistant input that is directed to the automated assistant application and that includes at least the command phrase, and wherein the assistant input is a touch input that is received at an area of the display interface corresponding to the selectable GUI element, and
         causing, based on receiving the assistant input, the automated assistant application to control the feature of the given application based on the assistant input.

6. The method of claim 5, further comprising:
   determining that the application interface of the given application is being rendered at the display interface of the vehicle computing device,
      wherein generating the prediction data is performed in response to determining that the application interface is being rendered at the display interface of the vehicle computing device.

7. The method of claim 5, further comprising:
   determining that the user is currently located within the vehicle, and
   determining that, during a prior instance when the user was located within the vehicle, the user accessed the application interface of the given application,
      wherein generating the prediction data is performed based on determining that the user is currently located within the vehicle and that the user previously accessed the application interface of the given application.

8. The method of claim 5, further comprising:
   processing contextual data using one or more trained machine learning models,
      wherein the contextual data characterizes one or more features of a context of the user, and
      wherein generating the prediction data is performed based at least on processing the contextual data.

9. The method of claim 8, wherein the one or more trained machine learning models are trained using data generated during one or more prior instances in which one or more other users accessed, while in a respective vehicle, the feature of the given application.

10. A method implemented by one or more processors, the method comprising:
- determining, by a vehicle computing device of a vehicle, that a user is engaging in a manual interaction with a given application of the vehicle computing device while the user is in the vehicle,
  - wherein the given application is separate from an automated assistant application that is accessible via the vehicle computing device, and
  - wherein the manual interaction with the given application is via a touch interface of the vehicle computing device;
- determining whether the particular operation is capable of being controlled via selectable content that is being rendered at the display interface of the vehicle computing device; and
- in response to determining that the user has completed the manual interaction with the given application of the vehicle computing device and in response to determining that the particular operation is capable of being controlled via the selectable content that is being rendered at the display interface of the vehicle computing device:
  - generating, by the vehicle computing device, and based on the manual interaction with the given application, suggestion data that characterizes a command phrase that, when submitted by the user and to the automated assistant application, causes the given application to perform a particular operation associated with the manual interaction between the user and the given application,
    - wherein generating the suggestion data that characterizes the command phrase is based on determining that the particular operation is capable of being controlled via the selectable content that is being rendered at the display interface of the vehicle computing device; and
  - causing, by the vehicle computing device, the suggestion data to be visually rendered at a display interface of the vehicle computing device,
    - wherein the command phrase is rendered in a foreground of the display interface of the vehicle computing device.

11. The method of claim 10, wherein the command phrase includes natural language content that characterizes an invocation phrase for invoking the automated assistant application and a request to perform the particular operation.

12. The method of claim 11, further comprising:
- receiving, by the vehicle computing device, a spoken utterance that is directed to the automated assistant application and embodies the request;
- determining, by the vehicle computing device, that the spoken utterance includes the request rendered at the display interface of the vehicle computing device; and
- causing, in response to receiving the spoken utterance, the given application to perform the particular operation associated with the interaction between the user and the given application.

13. The method of claim 12,
- wherein the command phrase is rendered when the user is in the vehicle during a first excursion; and
- wherein the spoken utterance is received when the user is in the vehicle during a second excursion.

14. The method of claim 10, wherein the application is a communication application and the selectable content includes one or more selectable elements for specifying a phone number and/or a contact to call.

15. The method of claim 10, wherein the application is a media application and the selectable content includes one or more selectable elements for specifying media to be visually rendered via the display interface of the vehicle computing device and/or audibly rendered via one or more speakers of the vehicle computing device.

* * * * *